United States Patent [19]

Hoffa

[11] Patent Number: 4,793,759
[45] Date of Patent: Dec. 27, 1988

[54] WIRE STRAND STACKING METHOD

[75] Inventor: Jack L. Hoffa, Brea, Calif.

[73] Assignee: Eubanks Engineering Co., Monrovia, Calif.

[21] Appl. No.: 132,430

[22] Filed: Dec. 14, 1987

Related U.S. Application Data

[62] Division of Ser. No. 22,982, Mar. 6, 1987.

[51] Int. Cl.$^4$ ............................................. B65H 39/06
[52] U.S. Cl. ......................................... 414/786; 83/29;
83/155.1; 83/160
[58] Field of Search ..................... 81/9.51; 83/29, 151,
83/153, 155.1, 158, 160; 140/140; 198/468.2;
414/16, 786

[56] References Cited

U.S. PATENT DOCUMENTS

| D. 232,323 | 8/1974 | Kimball | D 55/1 F |
|---|---|---|---|
| 3,869,781 | 3/1975 | Eubanks | 29/203 DT |
| 4,089,405 | 5/1978 | Loomis | 198/475 |
| 4,244,101 | 1/1981 | Talley | 29/753 |
| 4,256,427 | 3/1981 | Patel | 414/77 |
| 4,257,295 | 3/1981 | Patel | 83/374 |
| 4,266,455 | 5/1981 | Ago | 83/84 |
| 4,446,615 | 5/1984 | Talley | 29/742 |
| 4,489,476 | 12/1984 | Over et al. | 29/564.4 |
| 4,506,566 | 3/1985 | Schmid | 81/9.51 |
| 4,612,696 | 9/1986 | Talley | 29/564.4 |

Primary Examiner—Leslie J. Paperner
Assistant Examiner—Janice Krizek
Attorney, Agent, or Firm—William W. Haefliger

[57] ABSTRACT

A flexible strand stacker comprises:

(a) a conveyor having an elongated endwise traveling stretch onto which the strand is fed to be carried endwise on the stretch, (b) a gripper to grip a trailing portion of the strand as forward extent of the strand is carried endwise on the stretch, (c) structure to effect displacement of the gripper to a position locating the gripped portion of the strand sufficiently out of alignment with the stretch that the strand is progressively pulled sidewardly off the stretch in response to endwise travel of the stretch relative to the strand, (d) and a holder such as a roller is provided to temporarily and locally hold the trailing portion of the strand to the traveling conveyor means stretch to travel therewith; the holder then releases the wire strand and the gripper initially grips the trailing portion of the strand. Typically, the holder and the conveyor co-operate to effect transport of a selected length of wire on and along the traveling conveyor, so that the wire becomes positioned for gripping by the gripper, as will be seen.

4 Claims, 7 Drawing Sheets

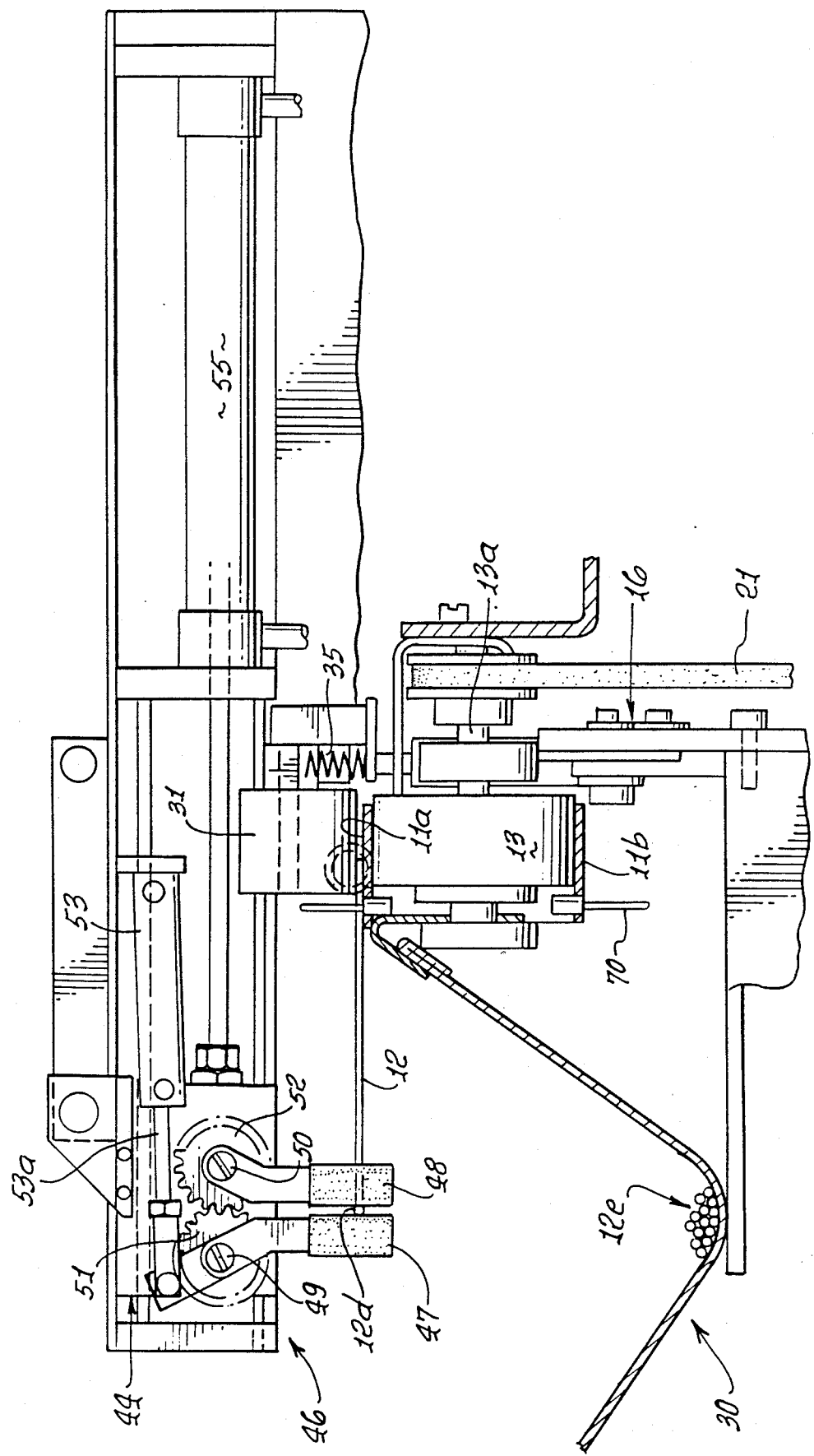

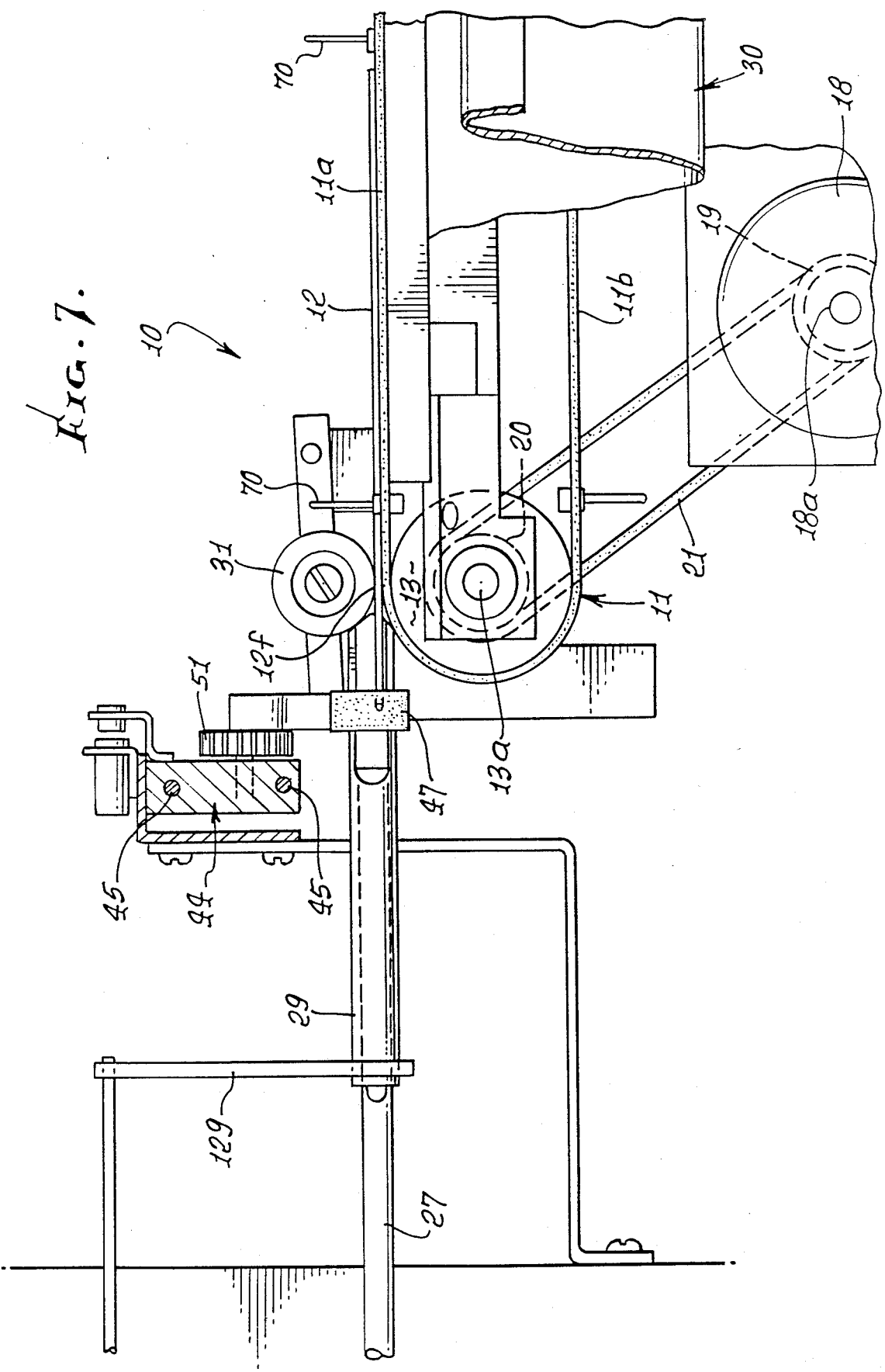

WIRE STRAND STACKING METHOD

This is a division of application Ser. No. 022,982, filed Mar. 6, 1987, still pending.

BACKGROUND OF THE INVENTION

This invention relates generally to handling of wire strands as for example are used in wire harnesses, and for other purposes; more specifically it concerns stacking of such strands, as for example flimsy wire strands, which have been cut to length, and/or stripped of insulation at strand ends, in conjunction with such cutting and/or striping.

The handling of elongated flimsy wire stands, following cutting and/or stripping, and particularly predetermined stacking of such strands, is a problem, specifically in respect of equipment that processes the wire at high speed, and continuously. Flimsiness of such long strands makes automatic handling thereof extremely difficult, particularly as respects wires of different length and sizes. There is need for equipment capable of automatically stacking such cut and/or stripped strands, and with precision. One highly advantageous form of such equipment is disclosed in U.S. application Ser. No. 857,961, still pending.

SUMMARY OF THE INVENTION

It is a major object of the present invention to provide improved apparatus and method capable of handling and stacking elongated strands so as to overcome the above, as well as other problems encountered in automatic processing of wire of different sizes, lengths, and flimsiness.

Basically, the stacker apparatus of the invention includes:

(a) conveyor means having an elongated endwise traveling stretch onto which the strand is fed to be carried endwise on said stretch, (b) gripper means to grip a trailing portion of the strand as forward extent of the strand is carried endwise on the stretch, (c) means to effect displacement of said gripper means to a position locating the gripped portion of the strand sufficiently out of alingment with the stretch that the strand is progressively pulled sidewardly off the stretch in response to endwise travel of the stretch relative to the strand, and (d) holder means to temporarily and locally hold the trailing portion of the strand to the traveling conveyor means stretch to travel therewith, until the strand is positioned for the gripper means to initially grip the trailing portion of the strand. Typically the holder and the conveyor co-operate to effect transport of a selected length of wire on and along the traveling conveyor, so that the wire becomes positioned for gripping by the gripper, as will be seen.

As will appear, the gripper means is typically moved linearly, tranversely of wire strand travel, and may typically comprise a clamp having a first position in which the clamp operates to grip the trailing portion of the strand as the strand travels past the gripper means, and a second position linearly spaced from said first position and in which the clamp continues to grip the strand until it is pulled free of the stretch, the strand then being released for stacking; and more particularly immediately after the wire is gripped and positioned linearly for peel-off from the conveyor, the next wire can be fed down the conveyor thus maintaining maximum through-put. The gripper is designed to position over the next moving wire after releasing the prior wire at the appropriate time for accurate stacking, and a suitable control is provided for timing.

The gripper means may comprise:

(i) a tranversely linearly movable carrier, and relatively rotatable jaws carried by the carrier, and (ii) actuator means operatively connected with the movable jaws to cause them to move between wire strand gripping and releasing positions as the carrier is displaced, transversely linearly. A collector is provided at a lower level relative to said stretch,, and into which the strand falls upon its release by the clamp.

In addition, means is provided to feed the wire strand for travel toward the gripper means and conveyor means, and the wire is typically cut to length as it is so fed.

It is a further object to provide a tubular guide to receive the strand, the guide having an advanced position in which the strand is fed onto the conveyor means, and a retracted position in which the guide is out of the path of linear displacement of the clamp.

A still further object includes the provision of barrier fingers traveling with said stretch and positioned to urge the strand off the stretch as the stretch travels endwise relative to the strand during gripping of the strand by the gripper means at a location out of alignment with the stretch. Such fingers initially att to block sideward displacement of the strand off the stretch and they may be attached to the conveyor belt, and may be flexible and bendable so as not t injure the wire strand being pulled off the conveyor. Also the fingers can be easily replaced in the field if worn or damaged.

These and other objects and advantages of the invention, as well as the details of an illustrative embodiment, will be more fully understood from the following specification and drawings, in which:

DRAWING DESCRIPTION

FIG. 1a is a cross-section through a typical wire;

FIG. 6 is an enlarged elevation taken on lines 6—6 of FIG. 5;

FIG. 7 is an elevation taken on lines 7—7 of FIG. 5;

FIG. 8 is an enlarged section taken on lines 8—8 of FIG. 2; and

FIG. 9 is a fragmentary elevation taken on lines 9—9 of FIG. 5.

DETAILED DESCRIPTION

Figure 1:
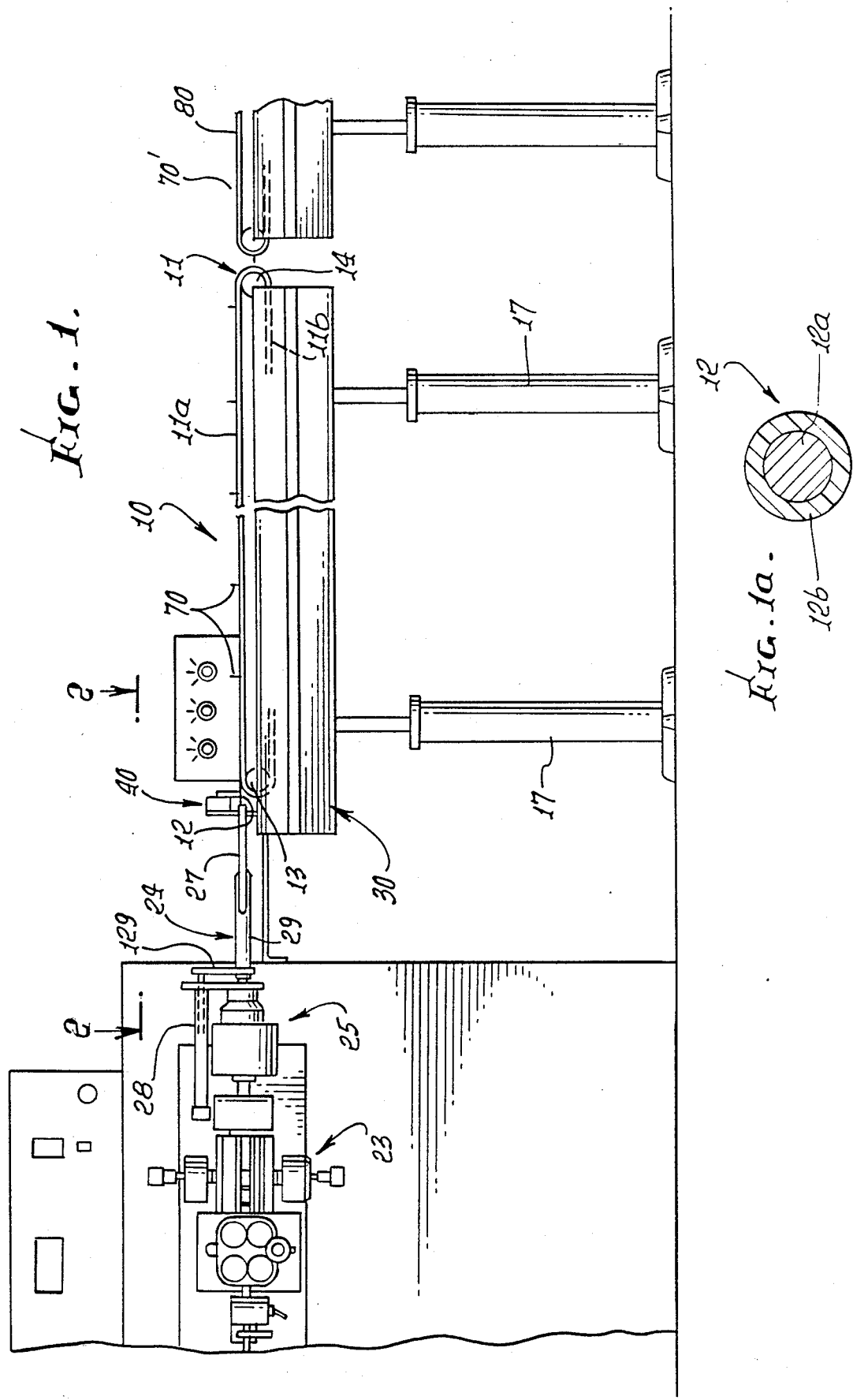
FIG. 1 is an elevation showing overall apparatus incorporating the invention, for stacking wire.

In FIGS. 1-7, conveyor means 10 has an elongated endwise traveling upper stretch 11a onto which a wire strand 12 is fed to be carried endwise (to the right in FIG. 1) on that stretch, in frictional contact with same. For this purpose, the conveyor may comprise an endless belt 11 of tough fabric material acting to frictionally retain and transport the wire on the top surface of belt upper stretch 11a, which travels rightwardly in FIG. 1. As seen in FIG. 1a, a typical flimsy wire strand 12 has a cross section that includes a metallic wire core 12a, and nonmetallic insulation sheath 12b about the core.

The conveyor means 10 also includes lengthwise spaced rollers 13 and 14 about which the belt 11 is entrained, the belt including upper stretch 11a sliding on a support table 15, and the belt lower stretch 11b traveling below that table. Frame structure 16 carries the table and rollers, and is in turn supported by standards 17. A drive for the conveyor includes motor 18, pulley 19 carried by the motor shaft 18a, pulley 20 carried by shaft 13a attached to roller 13, and belt 21 entrained on pulleys 19 and 20.

Figure 4:
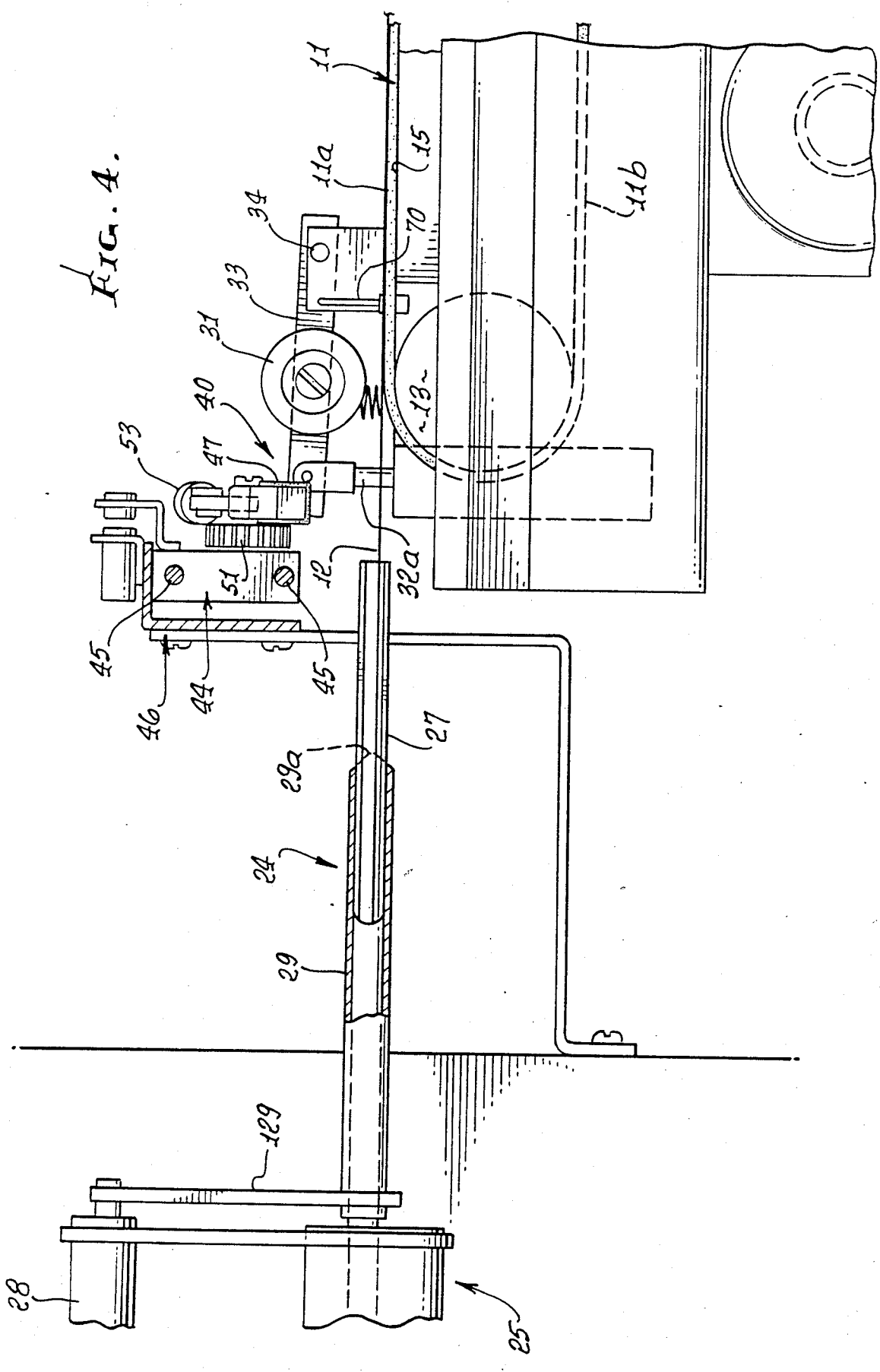
FIG. 4 is an elevation taken on lines 4—4 of FIG. 2.

The wire strand 12 is fed onto the belt upper stretch 11a in a rightward direction in FIGS. 1 and 4, to be carried rightwardly on that stretch. Apparatus to feed the wire to the belt is indicated generally in FIG. 1 to include wire feeding, cutting, and insulation stripping mechanism 23, and elongated wire guide mechanism 24. Cutting and stripping of the selected wire strand length at its trailing end is effected by means indicated at 25. Forwardly of that location, the wire travels forwardly within the guide mechanism 24, better seen in FIGS. 2 and 5, extending generally toward the conveyor means.

As the wire stand travels forwardly it is guided toward the conveyor upper stretch 11a by the guide means 24. The latter includes a tubular guide 27 to receive the wire strand. An outer guide tube 29 is also provided to slidably receive the inner guide tube. It is shown as having a retracted position in FIGS. 2 and 4, and an advanced position in FIG. 5, the wire strand being guided by the scalloped forward end 29a in that view. An actuator for the outer guide tube 29 is indicated at 28 in FIGS. 1 and 2. The tube connects to actuator 28 at 129.

The gripper means 40 serves to grip a trailing portion of the strand as forward extent of the strand is carried endwise on the conveyor upper stretch 11a. See for example FIGS. 3 and 6 wherein the gripper grips wire strand extent 12, first at its forward travel location 12c, in FIG. 3, and also as the strand section is displaced linearly sidewardly to location 12d, in FIG. 6, enabling the strand on the conveyor to be pulled off the conveyor as by travel of barrier fingers on the conveyor. Note that as the strand is displaced form travel position 12c to location 12d, the strand is positively pulled or displaced sidewardly thereby to be positioned to be pulled off the conveyor and to drop by gravity into the trough, when the gripper means releases the wire strand. See in FIG. 6 the released wire strands 12e dropping into the trough or collector 30.

A holder means such as clamp roller 31 has a first or "down" position (see FIG. 7) in which it grips the trailing portion 12f of the strand 12 as that trailing portion passes the gripper means prior to being gripped, thereby to hold the cut strand to the conveyor to travel therewith until the cut strand is in position to be gripped by gripper 40; also the holder has a second or "up" position (see FIG. 4) to stop endwise feeding of the strand by the conveyor. See actuator 32 having arm 32a connected to a lever 33 pivotally mounting roller 31 at 33a. A lever mounting pivot is shown at 34. Spring 35 urges the lever upwardly.

The gripper means also advantageously includes a carrier mounted by guide rods 45 on a fixed frame 46 for lateral movement. The carrier 44 carries two gripper jaws 47 and 48, for downward and closing together movement to grip opposite sides of the strand 12c. Jaws 47 and 48 are pivotally mounted to the carrier at locations 49 and 0, and spur gears 51 and 52 are pivotable with the jaws. As actuator 53 carried by frame 44 extends its arm 53a, it rotates jaw arm 47a, to pivot jaw 47 counterclockwise toward one side of the strand 12c, and simultaneously jaw 48 is pivoted clockwise by the gears to close against the opposite side of the strand. Actuator 55 on the frame then displaces the carrier 44 to the left from the FIG. 3 to the FIG. 6 position, as described. After reaching the FIG. 6 position, the jaws maintain the gripped wire strand at 12d in that position until the strand has been detrained sidewise off the conveyor, to drop into the collector 39.

Figure 5:
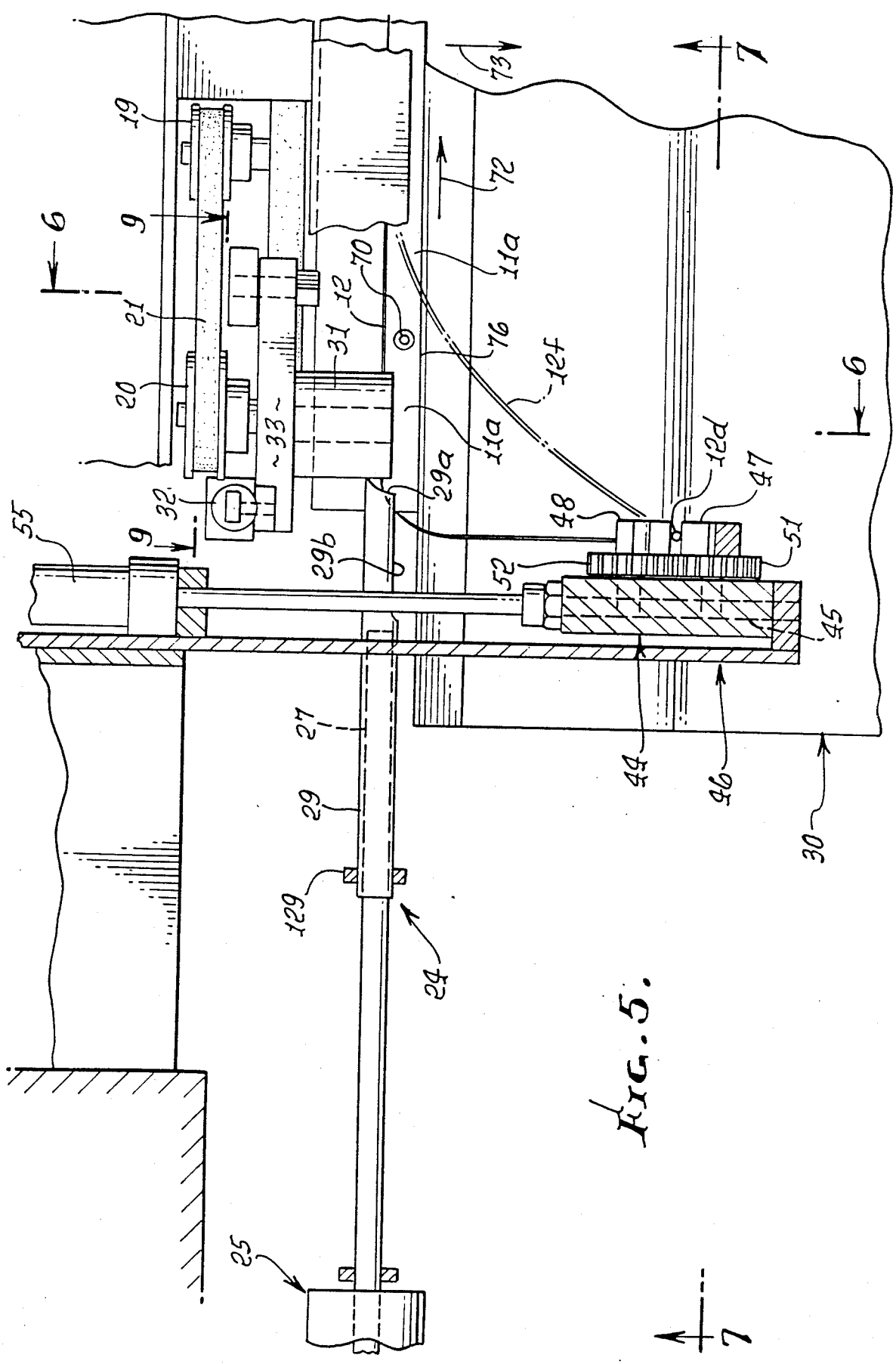
FIG. 5 is a view like FIG. 2, showing shifted position of elements.

Note in FIG. 5 that the gripped strand portion in position 12d remains in that position, out of alignment with the stretch 11a, so that the strand length thereon is progressively pulled sidewardly off the stretch 11a in response to endwise travel of the stretch 11a relative to the now retained strand. It is only after completion of pulling of the strand off the conveyor stretch 11a that the wire is released by the jaws 47 and 48, as the jaws are rotated back to the FIG. 3 position and the carrier retained in that position.

In this connection, pulling or urging of the strand laterally off the stretch 11a may advantageously be effected by the barrier fingers 70 traveling on and with the conveyor belt Alternatively, the fingers act to block sideward displacement off the stretch 11a of strand length on that stretch and traveled forwardly thereby. FIG. 5 shows that when the strand is gripped and displaced to position 12d by the gripper means, a finger 70 is carried up by roller 13 and the conveyor to approach the laterally deviated portion 12f of the strand, so that as that finger 70 then travels forwardly with the stretch in direction 72, the strand is progressively displaced or pulled in direction 73 away from the stretch, i.e. the strand is pulled off the stretch to drop into the collector. Multiple fingers 70 are mounted at 75 to the conveyor belt, adjacent the edge 76 thereof off which the strand is to be pulled or displaced. The fingers are flexible, or they are flexibly mounted, so as to bend relative to the belt, whereby risk of injury to the strand during pull off the stretch is eliminated.

A second conveyor may be provided as indicated at 80 in FIG. 1, and may have the same construction and drive as the first conveyor. The end-to-end conveyors are of a length to accomodate strands of chosen length.

The term "strands" may also apply to other flimsy, elongated, narrow, flexible bodies such as ropes, cords, tubes and the like.

The basic stacking method of the invention involves the following steps:

(a) feeding the strand endwise onto an elongated endwise traveling stretch to be carried endwise on said stretch, (b) causing the gripper means to grip a trailing portion of the strand as forward extent of the strand is carried endwise on the stretch, and (c) effecting displacement of said gripper means to a position locating the gripped portion of the strand sufficiently out of alignment with the stretch that the strand is progressively pulled sidewardly off the stretch in response to endwise travel of the stretch relative to the strand, and (d) holding the strand to the traveling stretch to be positioned for said gripping.

Figure 2:
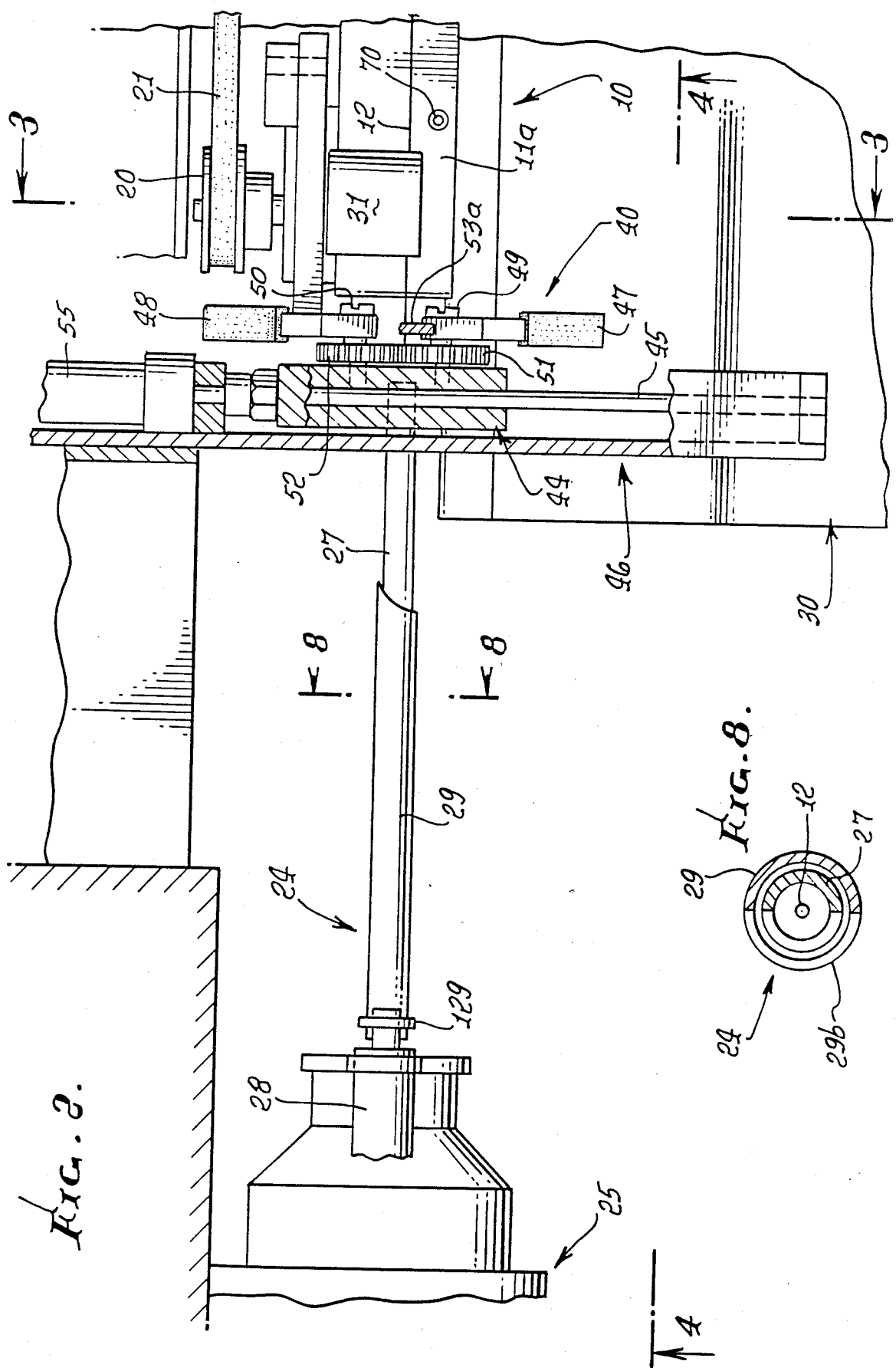
FIG. 2 is an enlarged plan view taken on lines 2—2 of FIG. 1.
Figure 3:
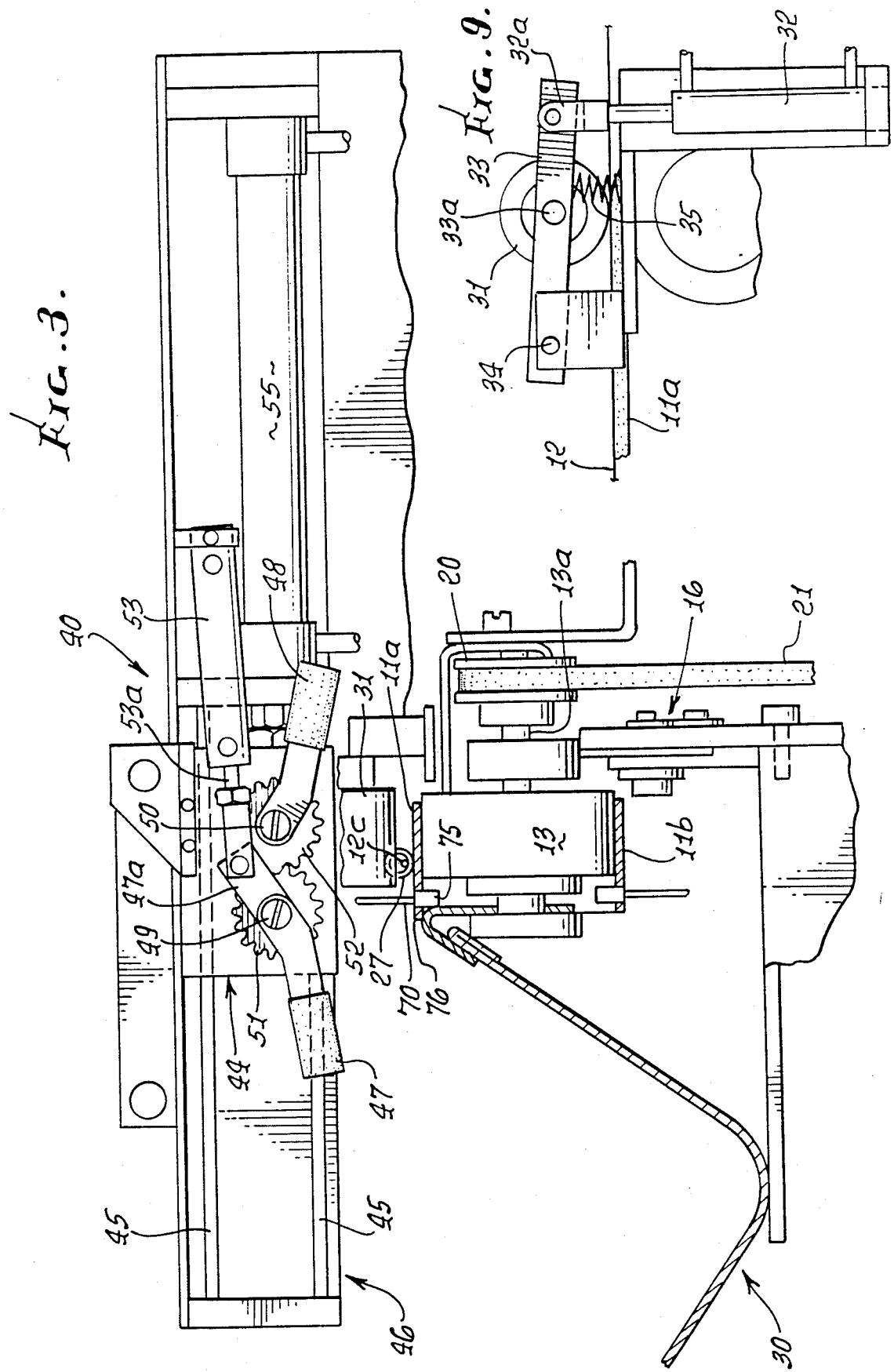
FIG. 3 is an elevation taken on lines 3—3 of FIG. 2.

Note in FIGS. 2 and 5 that the forward extent of tubular guide 29 is slot lengthwise along side 29b, to pass the wire being displaced by the clamps 47 and 48.

Also, fingers 70′ on the additional conveyor 80 are typically offset laterally in their travel path from the fingers 70 on the first conveyor means so as to ensure lateral pull of the strand from the second conveyor, into the trough. Thus, the fingers 70′ may be at the opposite side of the strand 12, relative to fingers 70.

I claim:

1. In the method of stacking a flexible strand, and employing conveyor means, and gripper means, the step that include:
    (a) feeding the strand endwise onto an elongated endwise traveling stretch to be carried endwise on said stretch,
    (b) causing the gripper means to grip a trailing portion of the strand as forward extent of the strand is carried endwise on the stretch, and
    (c) effecting displacement of said gripper means to a position locating the gripped portion of the strand sufficiently out of alignment with the stretch that the strand is progressively pulled sidewardly off the stretch in response to endwise travel of the stretch relative to the strand,
    (d) holding the strand to the traveling stretch to be endwise positioned for said gripping,
    (e) and including providing barrier fingers traveling with said stretch for blocking sideward displacement off said stretch of strand length on the stretch.

2. The method of claim 1 wherein said (b) step is carried out to grip a trailing end portion of the strand that has not yet been fed onto the stretch, and rearwardly of the locus of holding of the strand.

3. The method of claim 1 wherein said gripper means comprises a clamp and including linearly displacing the clamp between a first position in which the gripper grips the trailing portion of the strand as the strand travels past the gripper means, and a second position in which the clamp then releases the strand for stacking.

4. The method of claim 1 wherein said gripper means includes gripper jaws, and said (b) step includes rotating said jaws in opposite directions to locally engage the wire strand opposite sides.

* * * * *